(12) United States Patent
April, Jr. et al.

(10) Patent No.: US 8,399,607 B2
(45) Date of Patent: Mar. 19, 2013

(54) PAD TRANSFER PRINTING METHOD FOR MAKING COLORED CONTACT LENSES

(75) Inventors: Jimmie E. April, Jr., Conyers, GA (US); Richard Charles Breitkopf, Dunwoody, GA (US); Robert Carey Tucker, Suwanee, GA (US)

(73) Assignee: Novartis AG, Basel (CH)

( * ) Notice: Subject to any disclaimer, the term of this patent is extended or adjusted under 35 U.S.C. 154(b) by 160 days.

(21) Appl. No.: 12/968,337

(22) Filed: Dec. 15, 2010

(65) Prior Publication Data

US 2011/0149235 A1   Jun. 23, 2011

Related U.S. Application Data

(60) Provisional application No. 61/287,234, filed on Dec. 17, 2009.

(51) Int. Cl.
*C08G 64/00* (2006.01)
*C08G 63/02* (2006.01)
(52) U.S. Cl. .................. 528/480; 264/234; 351/177
(58) Field of Classification Search .............. 264/234; 528/480; 351/177
See application file for complete search history.

(56) References Cited

U.S. PATENT DOCUMENTS

| | | | |
|---|---|---|---|
| 3,159,602 A | 12/1964 | Hamilton | |
| 3,220,972 A | 11/1965 | Lamoreaux | |
| 3,419,593 A | 12/1968 | Willing | |
| 3,434,366 A | 3/1969 | Raso | |
| 3,536,386 A | 10/1970 | Spivack | |
| 3,814,730 A | 6/1974 | Karstedt | |
| 4,114,993 A | 9/1978 | Travnicek | |
| 4,340,709 A | 7/1982 | Jeram | |
| 4,405,773 A | 9/1983 | Loshaek | |
| 4,537,943 A | 8/1985 | Talcott | |
| 4,582,402 A | 4/1986 | Knapp | |
| 4,668,240 A | 5/1987 | Loshaek | |
| 4,704,017 A | 11/1987 | Knapp | |
| 4,857,072 A | 8/1989 | Narducy | |
| 5,034,166 A | 7/1991 | Rawlings | |
| 5,116,112 A | 5/1992 | Rawlings | |
| 5,120,121 A | 6/1992 | Rawlings | |
| 5,160,463 A | 11/1992 | Evans | |
| 5,272,010 A | 12/1993 | Quinn | |
| 5,414,477 A | 5/1995 | Jahnke | |
| 5,452,658 A * | 9/1995 | Shell | ............ 101/401.1 |
| 5,508,317 A | 4/1996 | Muller | |
| 5,583,163 A | 12/1996 | Muller | |
| 5,637,265 A | 6/1997 | Misciagno | |
| 5,782,460 A | 7/1998 | Kretzschmar | |
| 5,789,464 A | 8/1998 | Müller | |
| 5,849,810 A | 12/1998 | Müller | |
| 6,123,021 A | 9/2000 | Cameron | |
| 6,284,161 B1 | 9/2001 | Thakrar | |
| 6,393,981 B1 | 5/2002 | Cameron | |
| 6,407,145 B1 | 6/2002 | Müller | |
| 6,471,891 B1 | 10/2002 | Cameron | |
| 6,800,225 B1 | 10/2004 | Hagmann | |
| 6,878,314 B2 | 4/2005 | Cameron | |
| 6,899,426 B2 | 5/2005 | Tucker | |
| 6,902,274 B2 | 6/2005 | Tucker | |
| 6,955,832 B2 | 10/2005 | Quinn | |
| 6,979,419 B2 | 12/2005 | Cameron | |
| 7,011,408 B2 | 3/2006 | Tucker | |
| 7,083,278 B2 | 8/2006 | Broderick | |
| 7,201,481 B2 | 4/2007 | Rosenzweig | |
| 7,213,918 B2 | 5/2007 | Phelan | |
| 7,255,438 B2 | 8/2007 | Atkins | |
| 7,278,736 B2 | 10/2007 | Ocampo | |
| 7,306,333 B2 | 12/2007 | Tucker | |
| 7,329,695 B2 | 2/2008 | Tucker | |
| 7,354,959 B2 | 4/2008 | Tucker | |
| 7,411,008 B2 | 8/2008 | Tucker | |
| 7,550,519 B2 | 6/2009 | Phelan | |
| 7,726,237 B2 | 6/2010 | Fischer | |
| 2002/0190405 A1 | 12/2002 | Cameron | |
| 2003/0117576 A1 | 6/2003 | Thakrar | |
| 2003/0173704 A1 | 9/2003 | Cameron | |
| 2004/0222539 A1 | 11/2004 | Hagmann | |
| 2005/0185134 A1 | 8/2005 | Ocampo | |
| 2005/0218536 A1 | 10/2005 | Quinn | |
| 2005/0237483 A1 | 10/2005 | Phelan | |
| 2006/0055882 A1 | 3/2006 | Phelan | |
| 2006/0065138 A1 | 3/2006 | Tucker | |
| 2006/0077341 A1 | 4/2006 | Atkins | |
| 2006/0207446 A1 | 9/2006 | Fischer | |
| 2006/0251316 A1 | 11/2006 | Tucker | |
| 2007/0027228 A1 | 2/2007 | Tucker | |
| 2007/0070130 A1 | 3/2007 | Widman | |
| 2009/0252868 A1 | 10/2009 | Phelan | |

FOREIGN PATENT DOCUMENTS

| | | |
|---|---|---|
| WO | 9915327 A1 | 4/1999 |
| WO | 03054615 A2 | 7/2003 |

(Continued)

OTHER PUBLICATIONS

PCT International Search Report dated Feb. 22, 2011, International Application No. PCT/US10/60384, International Filing Date Dec. 15, 2010.
PCT Written Opinion of the International Searching Authority dated Feb. 22, 2011, International Application No. PCT/US10/60384, International Filing Date Dec. 15, 2010.

*Primary Examiner* — Terressa Boykin

(74) *Attorney, Agent, or Firm* — Sheng-Hsin Hu

(57) ABSTRACT

The present invention generally relates to a pad transfer printing method for making colored hydrogel contact lenses with good image quality. More specifically, the present invention relates to make and use a pad transfer printing pad comprises an addition-cure room temperature vulcanized silicon, which has subjected to post-heat treating. The post-heat treated pad transfer printing pad is characterized by having a reduced silicone residue release by at least 50 percent relative to a control transfer pad having identical composition without post heat treating.

19 Claims, No Drawings

FOREIGN PATENT DOCUMENTS

| | | |
|---|---|---|
| WO | 2005081048 A2 | 9/2005 |
| WO | 2005098478 A1 | 10/2005 |
| WO | 2005102675 A2 | 11/2005 |
| WO | 2006010612 A1 | 2/2006 |
| WO | 2006024520 A1 | 3/2006 |
| WO | 2006034863 A1 | 4/2006 |
| WO | 2006034864 A1 | 4/2006 |
| WO | 2006063836 A1 | 6/2006 |
| WO | 2006097306 A2 | 9/2006 |
| WO | 2006117205 A2 | 11/2006 |

* cited by examiner

PAD TRANSFER PRINTING METHOD FOR MAKING COLORED CONTACT LENSES

This application claims the benefit under 35 U.S.C. §119(e) of U.S. provisional application Ser. No. 61/287,234 filed on Dec. 17, 2009, herein incorporated by reference in its entirety.

The present invention generally relates to a method for making colored contact lenses. More specifically, the present invention relates to make and use a pad transfer printing pad comprising an addition-cure room temperature vulcanized silicone (RTV) which has been subjected to post-heat treating.

BACKGROUND OF THE INVENTION

Colored contact lenses are used to change the appearance of color of the eyes of the wearer and there are currently two dominant methods for coloring such lenses. In one method successive layers of coloring are applied to a mold surface in which the mold is filled with a liquid (composed of monomers and/or macromers) that harden into a lens upon curing. In the second method, a plurality of colored inks is successively applied to the outer surface of the formed contact lens and cured in place.

Since eye contact is an important element of human interaction, it is important that a colored contact lens impart an aesthetically pleasing colored print design to the eye of a wearer. To create such a complex pattern, a plurality of colors, each with a pattern of very fine dots, are applied to the surface of each lens or to the surface of a mold used to form a lens. To create the pattern for each color, a cliché is formed with the pattern of dots etched in the surface of the cliché. Colored ink is then applied into the etchings of the cliché, and when a print pad is subsequently pressed against the surface of the cliché, the ink in the etchings of the cliché is transferred to the surface of the print pad. After the pattern has been applied to the surface of the print pad, the print pad is pressed against the smooth surface of a contact lens or a contact lens mold to transfer the ink from the print pad to the smooth surface thereof.

A various pad transfer printing pads can be used to print ink for contact lenses (for example, U.S. Pat. Nos. 5,452,658 and 6,979,419. However, various problems may exist when using these known printing pads for the product of contact lenses. The print pads that are currently in use do not last more than 20,000 impressions before the print pads are no longer usable and must be replaced. The time used to stop the printing machine and replace the pad transfer printing pads is lost time and must be charged to the overall cost of manufacturing printed contact lenses. In addition, the printing pad softness is adjusted by adding silicone oil, which is known to affect print quality. However, high levels of silicone oil can transfer onto the contact lens, resulting in non-wetting spots during wear. There is also a problem that some print pads have shown toxicity, possibly due to tin-based catalyst components or impurities in its formulations. This could affect the biocompatibility of the resulting contact lens. Another problem with the print pads previously used was the poor adhesion. The old print pads would transfer the ink to the lens, but the ink would not always adhere permanently to the lens.

It would be desirable and advantageous to create a pad transfer printing pad with an optimum hardness to be used for contact lenses that would accept the ink from a source and release the ink freely to the lens (more affinity than the ink source but less affinity than the lenses), that would last for more 20,000 transfers, and still retain all the positive aspects of the prior art. The savings of such a pad transfer printing pad would be twofold: an initial savings for a reduced number of print pads to make the same number of contact lens impressions, and secondly, the time saved on a work shift that previously was used to change the print pads frequently.

It would be desirable if the improved print pad provided no toxicity to the contact lens and improve the biocompatibility of the contact lens.

It would also be desirable if the print pads had a reduced silicone oil residue release to enhance the print quality.

SUMMARY OF THE INVENTION

The invention, in one aspect, provides a method of making a pad transfer printing pad suitable for transferring ink to contact lenses comprising the steps of:
(a) providing a pad transfer printing pad, wherein the pad comprising an addition-cure room temperature vulcanized silicone (RTV);
(b) post heat treating the pad transfer printing pad so as to impart a reduced silicone oil residue release to the pad by at least 50 percent relative to a control pad transfer pad having identical composition without post heat treating.

The invention, in another aspect, provides a pad transfer-printing method for making a colored hydrogel contact lens, comprising the steps of:
(a) inking, with a color ink, at least one cliché having an image to be printed on a contact lens to form an inked image in the cliché;
(b) transferring the inked image from the cliché to at least one surface of at least one contact lens by means of at least one transfer pad, wherein the transfer pad comprises an addition-cure RTV silicone, and the transfer pad has been subjected to a post heat treatment so as to impart a reduced silicone oil residue release to the pad by at least 50 percent relative to a control pad transfer pad having identical composition without post heat treating,
(c) curing the inked contact lens to cause the color ink to adhere to the contact lens.

The invention, in a further aspect, provides a transfer-printing method for making a colored hydrogel contact lens, comprising the steps of:
(a) inking, with a color ink, at least one cliché having an image to be printed on a contact lens to form an inked image in the cliché;
(b) transferring the inked image from the cliché to at least one surface of at least one contact lens forming mold by means of at least one transfer pad, wherein the transfer pad comprises an addition-cure RTV silicone, and the transfer pad has been subjected to a post heat treatment so as to impart a reduced silicone oil residue release to the pad by at least 50 percent relative to a control pad transfer pad having identical composition without post heat treating,
(c) at least partially curing the inked image transferred on the mold surface to form a colored film;
(d) dispensing a hydrogel lens-forming material into at least one lens-forming cavity of the mold; and
(e) curing the lens-forming material within the lens-forming cavity to form the contact lens, whereby the colored film detaches from the molding surface and becomes integral with the body of the contact lens.

DETAILED DESCRIPTION OF EMBODIMENTS OF THE INVENTION

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well known and commonly employed in the art.

The invention is generally related to a method for making a colored hydrogel contact lens.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A contact lens can be in a dry state or a wet state. "Dry State" refers to a soft lens in a state prior to hydration or the state of a hard lens under storage or use conditions. "Wet State" refers to a soft lens in a hydrated state.

The "front or anterior surface" of a contact lens, as used herein, refers to the surface of the lens that faces away from the eye during wear. The anterior surface, which is typically substantially convex, may also be referred to as the front curve of the lens.

The "rear or posterior surface" of a contact lens, as used herein, refers to the surface of the lens that faces towards the eye during wear. The rear surface, which is typically substantially concave, may also be referred to as the base curve of the lens.

A "colored contact lens" refers to a contact lens (hard or soft) having a color image printed thereon. A color image can be a cosmetic pattern, for example, iris-like patterns, Wild Eye™ patterns, made-to-order (MTO) patterns, and the like; an inversion mark that allows a user to handle and insert easily a contact lens; a toric rotation mark, or contact lenses stock keeping units (SKUs), for example, either in forms of numbers or as bar codes. A color image can be a single color image or a multi-color image. A color image is preferably a digital image, but it can also be an analog image.

A colored contact lens can be produced by printing a high-quality color image directly on a contact lens using methods and systems of the invention. A contact lens can be clear before it is printed upon. Alternatively, a contact lens can be tinted prior to being printed upon. That is, a colorant may have been added to that lens using methods that are well known in the art before that lens is printed upon using a printing method of the invention.

A "colored coat" refers to a coating on an object and having a color image printed therein.

"Colorant" means either a dye or a pigment or a mixture thereof that is used to print a color image on an article.

"Dye" means a substance that is soluble in a solvent and that is used to impart color. Dyes are typically translucent and absorb but do not scatter light as much as pigments. Dyes can cover both optical regions of contact lenses and non-optical regions of contact lenses. Nearly any dye can be used in the present invention, so long as it can be used in an apparatus as described below. These dyes include fluorescent dyes, phosphorescent dyes, and conventional dyes.

A "pigment" means a powdered substance that is suspended in a liquid in which it is insoluble. Pigments are used to impart color. Pigments, in general, are more opaque than dyes.

The term "a conventional or non-pearlescent pigment" as used herein is intended to describe any absorption pigments that impart color based on the optical principle of diffuse scattering and its color is independent of its geometry. While any suitable non-pearlescent pigment may be employed, it is presently preferred that the non-pearlescent pigment is heat resistant, non-toxic and insoluble in aqueous solutions. Examples of preferred non-pearlescent pigments include any colorant permitted in medical devices and approved by the FDA, such as D&C Blue No. 6, D&C Green No. 6, D&C Violet No. 2, carbazole violet, certain copper complexes, certain chromium oxides, various iron oxides, phthalocyanine (PCN) green, phthalocyanine (PCN) blue, titanium dioxides, etc. See Marmiom DM Handbook of U.S. Colorants for a list of colorants that may be used with the present invention. A more preferred embodiment of a non-pearlescent pigment includes (C.I. is the color index no.), without limitation, for a blue color, phthalocyanine blue (pigment blue 15:3, C.I. 74160), cobalt blue (pigment blue 36, C.I. 77343), Toner cyan BG (Clariant), Permajet blue B2G (Clariant); for a green color, phthalocyanine green (Pigment green 7, C.I. 74260) and chromium sesquioxide; for yellow, red, brown and black colors, various iron oxides; PR122, PY154; for violet, carbazole violet; for black, Monolith black C-K (CIBA Specialty Chemicals).

"Pearlescence" means having a pearly luster; resembling a pearl in physical appearance; or having a nearly neutral slightly bluish medium gray color.

A "pearlescent pigment" refers to a class of interference (effect) pigments, which are transparent thin platelets of low refractive index material (e.g., transparent mica platelets) coated with optically thin coating of a high refractive index material (e.g., metal oxide, such as, for example titanium oxide or iron oxide), and which impart color mainly based on the optical principle of thin-film interference. The optically thin coating of metal oxide can be comprised of single or multiple thin layers of metal oxide. Optically thin coatings applied to the platelets contribute interference effects, which allow the appearance to vary depending upon illumination and viewing conditions. The color is determined by the coating thickness, the refractive index and the angle of illumination. Optically thin coatings are also responsible for the rich deep glossy effect due to partial reflection from and partial transmission through the mica platelets. This class of pigment can provide pearly luster and iridescent effects.

Pearlescent pigments which are mica platelets with an oxide coating are commercially available from by the Englehard Corp. of Iselin, N.J., under the "Mearlin Pigment" line, such as "Hi-Lite Interference Colors," "Dynacolor Pearlescent Pigments", "MagnaPearl", "Flamenco," and "Celini Colors." Additional manufacturers of pearlescent colorants are: Kemira, Inc. in Savannah, Ga., the pigments having the trade name "Flonac Lustre Colors"; and EM Industries, Inc. of Hawthorne, N.Y., the pigments having the trade name "Affair Lustre Pigments".

In the case of pearlescent pigments, it is important during processing to minimize platelet breakage and maintain a sufficient level of dispersion. Pearlescent pigments require gentle handling during mixing and they should not be ground, or subjected to prolonged mixing, milling or high shear since such operations can damage the pigments. Particle size distribution, shape and orientation strongly influence final appearance. Milling, high shear mixing or prolonged processing of pearlescent pigments should be avoided since such operations might lead to delamination of metal oxide coated layer, fragmentation of platelets, platelet agglomeration and platelet compaction. Delamination of metal oxide, compaction, fragmentation and agglomeration will reduce pearlescent effects.

"Stable" in reference to an ink, as used herein, means that the ink has a long pot and shelf life (i.e., stable for at least 8 hours, more preferably at least 2 days, even more preferably at least 7 days, most preferably at least three weeks). Typically stable inks have consistent viscosities over its lifetime, while unstable inks tend to increase viscosity and eventually solidify over time. A stable ink can provide more flexibility in producing colored ophthalmic lenses.

The term "olefinically unsaturated group" is employed herein in a broad sense and is intended to encompass any /groups containing at least one >C=C< group. Exemplary ethylenically unsaturated groups include without limitation acryloyl, methacryloyl, allyl, vinyl, styrenyl, or other C=C containing groups.

A "hydrogel" refers to a polymeric material which can absorb at least 10 percent by weight of water when it is fully hydrated. Generally, a hydrogel material is obtained by polymerization or copolymerization of at least one hydrophilic monomer in the presence of or in the absence of additional monomers and/or macromers.

A "HEMA-based hydrogel" refers to a hydrogel obtained by copolymerization of a polymerizable composition comprising HEMA.

A "silicone hydrogel" refers to a hydrogel obtained by copolymerization of a polymerizable composition comprising at least one silicone-containing vinylic monomer or at least one silicone-containing macromer.

"Hydrophilic," as used herein, describes a material or portion thereof that will more readily associate with water than with lipids.

"Ophthalmically compatible", as used herein, refers to a material or surface of a material which may be in intimate contact with the ocular environment for an extended period of time without significantly damaging the ocular environment and without significant user discomfort. Thus, an ophthalmically compatible contact lens will not produce significant corneal swelling, will adequately move on the eye with blinking to promote adequate tear exchange, will not have substantial amounts of protein or lipid adsorption, and will not cause substantial wearer discomfort during the prescribed period of wear.

"Ocular environment", as used herein, refers to ocular fluids (e.g., tear fluid) and ocular tissue (e.g., the cornea) and/or conjunctiva which may come into intimate contact with a contact lens.

A "lens-forming material" refers to a polymerizable composition which can be cured (i.e., polymerized and/or crosslinked) thermally or actinically to obtain a crosslinked polymer. As used herein, "actinically" in reference to curing or polymerizing of a polymerizable composition or material or a lens-forming material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art. Lens-forming materials are well known to a person skilled in the art. Typically, a lens-forming material is a solution or a solvent-free liquid or melt of one or more prepolymers, one or more vinylic monomers, and/or one or more macromers optionally in the presence of various other components, e.g., such as, photoinitiator, inhibitors, fillers, and the like.

A "prepolymer" refers to a starting polymer which can be cured (e.g., crosslinked and/or polymerized) actinically or thermally or chemically to obtain a crosslinked and/or polymerized polymer having a molecular weight much higher than the starting polymer. A "crosslinkable prepolymer" refers to a starting polymer which can be crosslinked upon actinic radiation to obtain a crosslinked polymer having a molecular weight much higher than the starting polymer.

A "monomer" means a low molecular weight compound that can be polymerized. Low molecular weight typically means average molecular weights less than 700 Daltons.

A "vinylic monomer", as used herein, refers to a low molecular weight compound that has an ethylenically unsaturated group and can be polymerized actinically or thermally. Low molecular weight typically means average molecular weights less than 700 Daltons.

A "hydrophilic vinylic monomer", as used herein, refers to a vinylic monomer which as a homopolymer typically yields a polymer that is water-soluble or can absorb at least 10 percent by weight water. Suitable hydrophilic monomers are, without this being an exhaustive list, hydroxyl-substituted lower alkyl ($C_1$ to $C_8$) acrylates and methacrylates, acrylamide, methacrylamide, (lower allyl)acrylamides and -methacrylamides, ethoxylated acrylates and methacrylates, hydroxyl-substituted (lower alkyl)acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino (lower alkyl)- (where the term "amino" also includes quaternary ammonium), mono(lower alkylamino)(lower alkyl) and di(lower alkylamino)(lower alkyl)acrylates and methacrylates, allyl alcohol and the like.

A "hydrophobic vinylic monomer", as used herein, refers to a vinylic monomer which as a homopolymer typically yields a polymer that is insoluble in water and can absorb less than 10 percent by weight water.

A "macromer" refers to a medium and high molecular weight compound or polymer that contains functional groups capable of undergoing further polymerizing/crosslinking reactions. Medium and high molecular weight typically means average molecular weights greater than 700 Daltons. Preferably, a macromer contains ethylenically unsaturated groups and can be polymerized actinically or thermally.

A "polymer" means a material formed by polymerizing/crosslinking one or more monomers.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

"A binder polymer" refers to a crosslinkable polymer that can be crosslinked by a crosslinker or upon initiation by a chemical or physical means (e.g., moisture, heating, UV irradiation or the like) to trap or bind colorants onto or into a contact lens such as that term is known in the art.

As used herein, "good adhesion to a contact lens" in reference to a colored coat or an ink means that the colored coat (with a color image) generated on the lens with the ink can pass a sterilization-surviving test and at least a finger rubbing test, preferably further pass a sonication-in-methanol (or other suitable solvent, e.g., such as isopropanol) surviving test.

The finger rubbing test is performed by removing the hydrated contact lens from a packaging solution, e.g., saline, and digitally rubbing the lens between either two fingers or a finger and a palm for up to about 10 seconds. Visible and microscopic (~10×) observation of colorant bleeding, smearing, or delamination indicates failure of the rub test.

"Passing a sterilization-surviving test" means that no significant decoloring or delamination or the like can be observed after sterilization. Production of contact lenses always involves a step of sterilization, such as autoclave, or irradiation with UV light, X-ray, or the like. For example, an autoclave-surviving test can be performed by removing a sterilized contact lens from a packaging solution, e.g., saline, and immersing it into a vial of methanol. The vial containing the hydrated contact lens and methanol is sonicated for 30 seconds using a standard laboratory sonicator. The lens is then removed from the methanol and placed back into the packaging solution. A finger rubbing test is performed on this lens. Observation of bleeding, smearing, or delamination indicates failure of this test.

A "good compatibility with a HEMA-based hydrogel material" in reference to an ink means that a colored image-containing surface of a colored contact lens, obtained according to a print-on-mold process for producing colored contact lenses, appears homogeneous and smooth (no observable wrinkles).

A "print-on-mold process for producing colored contact lenses" refers to a process for molding a colored contact lens described in U.S. Pat. No. 5,034,166 to Rawlings et al. (herein incorporated by reference).

A "good transferability from a mold to a contact lens" in reference to an ink or a colored coat means that a color image printed on a molding surface of a mold with the ink can be transferred completely onto a contact lens cured (thermally or actinically) in that mold.

A "post-heat treating the pad transfer printing pad" in reference to heat treating the pad transfer printing pad after the printing pad has been cured in the mold and removed from the mold.

A "pad residue release" method is a technique used to measure the amount of fluid that is removed from a print pad during a prolonged compression. The test procedure is described as follows:

Definition: Print pad: a hemisphere or conical object typically made of silicone rubber, a hydrophobic material. It can have different shapes depending on the surface that needs to be printed. The pads are used for printing lenses and they pick up the ink from the cliché and transfer it to the lens surface.

Procedure: A. Preparation pf Pan and Filter Paper:
A1) Take one aluminum pan and using the tweezers place one filter paper (#40 ashless filter paper; What man Filter Paper diameter of 55 millimeters) in the aluminum pan (diameter of 55 millimeters).
A2) Zero the balance.
A3) Place the aluminum pan with the filter paper on the balance and record the weight.

B. Pad Compression:
B1) Open the caliper to a value equal to the height of the pad (including the base) minus 5 mm or use a 30 mm gauge block.
B2) Without touching the surface of the pad, place it with the tip against the filter paper and guide it inside the vise (workshop vise, i.e. Wilton 4½"). One side of the vise should be touching the base of the pad, while the other side should be touching the bottom of the aluminum pan.
B3) Tighten the vise until the distance between the two sides equals the aperture of the caliper set in B1. By using a 30 mm gauge block (assuming pad height is 35 mm), the vise may be tighten to gauge block.
B4) Keep the pad compression for 15 minutes. Check the time using the calibrated timer.
B5) After the fifteen minutes have elapsed, carefully remove the pad, the aluminum pan.

C. Data Collection
C1) Place the aluminum pan with the filter paper on the zeroed balance and record the weight.
C2) Calculate the difference between the initial and the final weight and record it as amount of silicone residue release (C).

The amount under the prolonged compression can be related to the amount released by a print pad during a shorter compression time. A "reduced silicone residue release" is in reference to the reduced residue silicone relative to a control transfer print pad having identical composition without post heat treatment. The percentage of the reduced residue silicone due to the post heat treatment is defined as ratio of $[(C_{with\ post\ heat\ treatment} - C_{control\ without\ post\ heat\ treatment})/C_{control\ without\ post\ heat\ treatment}] \times 100$; $C_{with\ post\ heat\ treatment}$ is amount of residue silicone measured when a transfer print pad without subjecting to a post heat treatment.

This invention is directed to methods for making pad transfer printing pad. In one aspect, the present invention provides a method of making a pad transfer printing pad suitable for transferring ink to contact lenses comprising the steps of:

(a) providing a pad transfer printing pad, wherein the pad comprising an addition-cure room temperature vulcanized silicone;

(b) post heat treating the pad transfer printing pad to provide a reduced silicone oil residue release by at least 50 percent relative to a control pad transfer pad having identical composition without post heat treating.

According to the present invention, the pad transfer printing pad comprises room temperature (RTV) silicone. There are two common classes of RTV silicone: 1.) Tin catalyzed or "Condensation-Cure" silicones; 2) "Addition-Cure" silicones. The catalyst used for the addition-cure silicones may be a metal catalyst of platinum group known in the art, and exemplary such catalysts include platinum black, platinic chloride, chloroplatinic acid, reaction product of chloroplatinic acid and a monohydric alcohol, complex of chloroplatinic acid and an olefin, complex of chloroplatinic acid and vinyl siloxane, a platinum catalyst such as platinum bisacetoacetate, palladium catalyst, rhodium catalyst. According to the present invention, the preferred addition-cure RTV silicone is platinum catalyzed. Each involves two-parts that are combined to begin the curing process. The crosslinking reaction of condensation-cure silicones eliminates a low alcohol, usually ethanol or propanol. The print pad cannot be used until all the alcohol formed has evaporated. Evaporation of the alcohol causes a reduction in the weight and three-dimensional shrinkage of the print pad of the order of <5 percent by volume. Addition-curing RTV may be cured at temperature between 10 deg. C. and 200 deg. C. Since no volatile reaction products are produced during crosslinking, vulcanization of addition-curing RTV silicone can be therefore used immediately after demolding without further heat treatment or wait.

In an embodiment of a two-part addition catalyzed RTV, Part A includes a platinum group catalyst, Part B includes a (silyl) SiH polyorganosiloxane polymer and a SiH crosslinker. A vinyl terminated polyorganosiloxane polymer is present in at least one of Part A and Part B.

A platinum type catalyst includes platinum and/or rhodium compounds. Representative conventional catalyst compounds are disclosed in U.S. Pat. Nos. 3,159,602; 3,220,972; 3,419,593; and 3,814,730. The amount of catalyst is typically present between 2 and 500 parts per million of platinum or rhodium relative to total weight of vinyl- and silyl-polyorganosiloxanes present.

Adjustment of the ratio of vinyl groups to silyl groups is known in the art to be a formulation variable of consequence in the properties of the resultant RTV. Typical vinyl: silyl ratios are between 0.2:1 and 10:1.

The critical division between the two parts of a two-part RTV is the separation of the platinum catalyst (Part A) from polymers including silyl moieties (Part B). Otherwise, there is considerable latitude as to whether a vinyl containing species, various fillers, and additives reside in Part A or Part B or both of the composition storage components. Representative formulations are found in U.S. Pat. Nos. 3,220,972; 4,340,709; and 3,434,366.

Examples of RTV silicone compositions that are commercially available include silicone RTVs from Nusil Technology, including those under the trade/product designations CF15-2186, CF19-2186, MED1-4013, and MED2-4013; and RTV silicone solutions from Factor II, Inc./Dow Corning, including those under the trade/product designations MDX4-4159, A-2186, and A-588. Preferred RTV silicone compositions are the MED1-4013 and CF19-2186 available from Nusil Technology. Various other RTV silicone compositions, crosslinkable polysiloxanes, crosslinking agents, catalysts and additives are available from Silicones, Inc., Precision Silicones, Inc., the Walco Materials Group of Synair Corp., General Electric, Bayer, Hulls America, Shiastu, Shin Etsu, Rhone Poulenc, Wacker Silicones, Degussa, Dow Corning, and Cabot Corp.

In accordance with the present invention, the preferred print pad material is a high strength silicone rubber resin with platinum catalyst solution for curing, combined with silicone oil (50-300 cSt) to lower final durometer. For example, P10 formulation from Silicones, Inc., High Point, N.C. is preferred material.

Optionally, a plasticizer can be incorporated into a RTV silicone of the invention. Plasticizers conventional to the art and operative herein illustratively include M-stopped polydimethylsiloxane fluids, aliphatic liquid polymers, oils, alkyl phosphates, castor oil derivatives, polyalkylene glycols, polyolefins and polyalkylenes. In the present invention, silicone oil is added to RTV silicone to function as a plasticizer since silicone oil does not take part in the curing. The addition of silicone to the RTV will reduce the separation force in its demolding but also reduce hardness, tensile strength and tear strength of vulcanized RTV.

According to the present invention, a silicone oil present from between 0 and 40 total weight percent. Preferably, the silicone oil is present from 5 to 30 total weight percent. The viscosity of the silicone oil is in the range between 1.0 centipoise and 10,000 centipoise. Preferably, the viscosity of the silicone oil is in the range of between 50 centipoise and 200 centipoise.

According to the present invention, the transfer pad is typically angled rather than flat to create a "rolling" effect when compressed in order to allowed air to escape from the etched image. Generally, the smaller the etched image the steeper the angle. In the present invention, the print pad has a round shape.

The amount of silicone oil added to the silicone rubber during formulation has an effect on hardness of a pad transfer printing pad. The more silicone oil is added, the softer the pad will be. Adding silicone oil will reduce the separation force for removing transfer pad from mold but also lower the tensile strength and the swell resistance of the silicon rubber. Pad prepared with high silicone oil will contaminate the lens. Said contaminant on the contact lens gives rise to non-wetting spots when being worn. There are conflicting requirements for pad manufacturing: the pad needs to have a high silicone oil content for easy pad removal from the mold, but a pad with high silicone oil content will contaminate the lens during the pad transfer printing process. Another conflicting requirement is that the pad need high tensile strength to provide long printing life, but pads that are too hard may damage the contact lens on which the pad needs to contact under pressure to transfer ink.

The present invention is generally directed to a pad transfer printing pad comprising an addition-cure room temperature vulcanized silicone. The present invention is partly based on the discovery that the post heating the pad transfer printing pad which containing a high amount of extractable silicone material (for example silicone oil) can impart a reduced silicone residue release to the pad by at least 50 percent, preferred by at least 65 percent, or more preferred 75 percent, or still more preferred 85 percent, or still further more preferred 95 percent, relative to a control transfer pad having identical composition without post heat treating. The present invention is further partly based on the discovery the pad transfer printing pad which containing a high amount of extractable silicone material (for example silicone oil) not only provides a fewer pad to base adhesive failures but also provides better print quality after a post heat treatment.

The hardness of cured printing pads is typically too low to allow accurate measurement with the Shore A hardness scale. For print pads, the Shore 00 indentation scale is used. Whereas for both Shore 00 and Shore A hardness, higher values means greater hardness. According to the present invention, the print pad has a hardness ranges from 50 to 90 Shore (00).

The quality of image printed on the product is also dependent upon the pad surface texture. The surfaces of the contact lenses and of the mold or casting cups used to form such contact lenses are smooth metal, plastic, glass or crystalline substrate, all of which are traditionally difficult material for receiving inks. A print pad which is suitable for retracting a delicate pattern of ink from a cliché and transferring that pattern to the surface of a contact lens must have a textured surface in which the degree of texturing must be carefully controlled. A print pad which does not have the proper texturing evenly applied across its useable surface will cause the inks applied to become blotted, smeared, or to be incompletely transferred.

To obtain print pads having the needed degree of texturing the silicone print pads are formed in metal molds having polished inner surfaces such that the finished print pads have a smooth, glossy surface. The surfaces are subsequently mechanically textured using a proven texturing procedure. One such procedure is to condition a new print pad by using the print pad for a period of time, usually fifteen to thirty minutes, until the surface thereof becomes sufficiently worn that it will properly transfer ink. Although the pad can be properly textured by "conditioning" the process is time consuming and it greatly reduces the efficiency of the machine that applies color to the lenses.

In order to address this problem, the present invention, the textured printing pad is made with a 0.5 to 2.0 μm surface finish as measured using the root mean squared (RMS) method. The textured printing pad is accomplished through use of chemicals, grit blasting, sandpaper, or ultrahigh-pressure jets. The manufacturing process for textured print pad is also described in U.S. Pat. No. 6,979,419, herein incorporated by reference in their entireties. A print pad in accordance with the U.S. Pat. No. 6,979,419 is made of silicone rubber such as the type available from Dow Corning and sold under its trademark HS III RTV (a condensation-cure RTV silicon employing a Tin-based catalyst). HS III RTV is also described in U.S. Pat. No. 5,452,658 herein incorporated by reference in their entireties.

In accordance with the present invention, the texture of a printing pad is connected with print performance. Print performance seems can be correlated with surface gloss, such as determined with a Novo-Curve Gloss meter (Rhopoint Instruments) (60 degree gloss meter). In accordance with the present invention, the correct range for a textured print pad is between 1 and 10 GU (Gloss units), preferred between 5 to 8 GU, while a poorly textured print pad are greater than 10 GU. The Novo-Curve Gloss meter is used for measuring flat, curved, small, large, matte or mirror surface, so this system was a good fit with the curved surface of the printed pad. Essentially, light from the machine bounces off the print pad, where the reflected or scattered light is measured and converted into gloss units (GU).

In according with the present invention, some print pads have shown toxicity, possibly due to tin-based catalyst components or impurities in its formulations. This could affect the biocompatibility of the resulting contact lens New printing pads made from silicone rubber formulations and different types of catalysts are evaluated for in vitro cytotoxicity using the USP Elution Test. This test is conducted using the USP Elution Test according to SP BS-CB-020 (current revision). L929 cells constitute the test system for this assay. L-929 (ATCC # CCL-1, NCTC clone 929) cells are purchased from ATCC and verified by their accompanying Certificate of Analysis. The test method and procedures are in accordance with the guidelines of the current USP, General Chapters<87> and <88>, and ISO 10993-5 and 10993-12.

Minimum Essential Medium (MEM) extracts of the test samples are evaluated for in vitro cytotoxicity using the USP Elution Test. The materials are extracted according to USP guidelines 2 gm of each sample fragment/10 mL in Minimum Essential Medium (MEM) are tested at 100% concentration. The control solutions are diluted with growth medium (1:3) to produce a 25% concentration of the respective solution.

Aliquots of the MEM extracts are placed on the cell cultures. The cultures are incubated in a $CO_2$ incubator for approximately 48 hours. Following incubation the cells were observed microscopically of evidence of cytotoxicity as indicated by trypan blue staining, morphological changes, cell lysis and/or extensive empty spaces between cells. The samples are then scored for Reactivity Grade and cytotoxicity according to the USP Elution Test procedure.

According to the present invention, the ink typically comprises a solvent, a colorant, a crosslinker, and a binder polymer.

A solvent can be water, an organic solvent, a mixture of several organic solvents, or a mixture of water and one or more water soluble or water miscible organic solvents. Any known suitable solvents can be used, so long as they can dissolve the binder in the ink of the invention and aid in the stability of the colorant. Exemplary solvents include, without limitation, water, acetone, alcohols (e.g., methanol, ethanol, propanol, isopropanol, 2-ethyoxyethanol, etc.), glycols, ketones, esters, cyclopentanone, cyclohexanone, tetrahydrofuran, acetone, methyl-2-pyrrolidone, dimethyl formamide, acetophenone, methylene dichloride, dimethyl sulfoxide, gamma-butyrolactone, ethylene dichloride, isophorone, o-dichlorobenzene, tetrahydrofuran, diacetone alcohol, methyl ethyl ketone, acetone, 2-nitropropane, ethylene glycol monoethyl ether, propylene carbonate, cyclohexanol, chloroform, trichloroethylene, 1,4-dioxane, ethyl acetate, ethyl lactate, ethylene glycol monobutyl ether, chlorobenzene, nitroethane, ethylene glycol monomethyl ether, butyl acetate, 1-butanol, methyl isobutyl ketone, nitromethane, toluene, ethanol, diethylene glycol, benzene, diethyl ether, ethanolamine, carbon tetrachloride, propylene glycol, hexane, ethylene glycol, and formamide.

A colorant can be a dye, or preferably a pigment. In general, dyes may not provide a highly opaque print that pigment can provide. Preferably, a colorant in an ink of the invention comprises at least one pigment. A colorant also may be a mixture of two or more pigments, which in combination provides a desired color, since any color can be obtained by merely mixing two or more primary colors together, As defined herein, "primary colors" mean cyan, yellow, magenta, white, and black. A colorant may also be a mixture of at least one pigment and at least one dye. A person skill in the art will know how to select colorants.

Non-Pearlescent Pigment(s) are preferably about 5 microns or smaller in size. Larger particles of a pigment can be ground into smaller particles. Any number of methods known in the art can be used to grind pigment. Exemplary preferred methods of reducing a pigment's particle size include high speed mixers, Kady Mills (rotor stator dispersion device), colloid mills, homogenizers, microfluidizers, sonalators, ultrasonic mills, roll mills, ball mills, roller mills, vibrating ball mills, attritors, sand mills, varikinetic dispensers, three-roll mills, Banbury mixers, or other methods well known to those of skill in the art. In the case of pearlescent pigments it is important during processing to minimize platelet breakage and maintain a sufficient level of dispersion. Pearlescent pigments require gentle handling during mixing and they should not be ground, or subjected to prolonged mixing, milling or high shear since such operations can damage the pigments. Particle size distribution, shape and orientation strongly influence final appearance. Milling, high shear mixing or prolonged processing of pearlscent pigments should be avoided since such operations might lead to delamination of metal oxide coated layer, fragmentation of platelets, platelet agglomeration and platelet compaction. Delamination of metal oxide, compaction, fragmentation and agglomeration will reduce pearlescent effects.

A binder polymer of the invention can contain any functional group that can be reacted with a separate crosslinking agent, or has functional groups that react on its own as a crosslinking agent. These crosslinking groups can react upon initiation by a chemical or physical means (e.g., moisture, heating, UV irradiation or the like) to trap or bind colorants onto or into a contact lens such as that term is known in the art.

Examples of binder polymer are those disclosed in U.S. Pat. Nos. 4,668,240, 4,857,072, 5,272,010, 5,414,477 and U.S. Pat. No. 7,411,008 which are incorporated herein by references in their entireties. The preferred inks used to practice this invention are known and described in Loshaek's U.S. Pat. No. 4,668,240, incorporated herein by reference. The preferred inks contain binder polymer having —COOH, —OH, or —NH.—R, wherein R is hydrogen or alkyl and a diisocyanate compound. First a solution of binding polymer and solvent is prepared and this solution is mixed with paste containing the coloring substance to form an ink. The preferred binding polymer solutions described in the Loshaek patent have a viscosity of 25,000 CPS.

According to the present invention, any lens-forming materials known in the art may be used in the invention. Preferred lens-forming materials are capable of forming hydrogels. A lens-forming material may be made up of vinylic monomers like HEMA (hydroxyethylmethacrylate) or may comprise one or more prepolymers, optionally one or more vinylic monomers and/or macromers and optionally further include various components, such as photoinitiator, visibility tinting agent, fillers, and the like. It should be understood that any silicone-containing prepolymers or any silicone-free prepolymers can be used in the present invention. While the selection of a lens-forming material is largely determined upon the final modality of use of the final contact lens, the presently preferred lens material is a modified polyvinyl alcohol prepolymer as disclosed in EP-A-641806, for example Nelfilcon (a product of Ciba Vision Corp, USA). Nelfilcon is particularly preferred because it is water soluble and finished lens of optical quality can be produced from it within a few seconds, without the necessity for subsequent extraction or finishing steps.

Examples of preferred lens forming polymers comprise vinylic monomers like HEMA (hydroxyethylmethacrylate) and are described in U.S. Pat. No. 4,405,773 (Loshaek et al.), 4,668,240 (Loshaek et al.), which are incorporated herein by references in their entireties.

This invention is also directed to methods for making a colored hydrogel contact lens.

In a further aspect, the present invention provides a transfer-printing method for making a colored hydrogel contact lens, comprising the steps of:
(a) inking, with a color ink, at least one cliché having an image to be printed on a contact lens to form an inked image in the cliché;
(b) transferring the inked image from the cliché to at least one surface of at least one contact lens forming mold by means of at least one transfer pad, wherein the transfer pad comprises an addition-cure RTV silicone, wherein the transfer pad has been subjected to a post heat treatment so as to impart a reduced silicone oil residue release to the pad by at least 50 percent relative to a control pad transfer pad having identical composition without post heat treating,
(c) at least partially curing the inked image transferred on the mold surface to form a colored film;
(d) dispensing a hydrogel lens-forming material into at least one lens-forming cavity of the mold; and
(e) curing the lens-forming material within the lens-forming cavity to form the contact lens, whereby the colored film detaches from the molding surface and becomes integral with the body of the contact lens.

In still a further aspect, the present invention provides a transfer-printing method for making a colored hydrogel contact lens, comprising the steps of:
(a) inking, with a color ink, at least one cliché having an image to be printed on a contact lens to form an inked image in the cliché;
(b) transferring the inked image from the cliché to at least one surface of at least one contact lens forming mold by means of at least one transfer pad, wherein the transfer pad comprises an addition-cure RTV silicone, wherein the transfer pad has been subjected to a post heat treatment so as to impart a reduced silicone oil residue release to the pad by at least 50 percent relative to a control pad transfer pad having identical composition without post heat treating,
(c) at least partially curing the inked image transferred on the mold surface to form a colored film;
(d) dispensing a hydrogel lens-forming material into at least one lens-forming cavity of the mold; and
(e) curing the lens-forming material within the lens-forming cavity to form the contact lens, whereby the colored film detaches from the molding surface and becomes integral with the body of the contact lens.

Where an ink is applied first to a molding surface of a mold to form a colored coat on the molding surface, the ink can be cured prior to dispensing of a lens-forming material into the printed mold. Alternatively, the ink can be cured simultaneously with the lens-forming material in the lens-forming cavity of the printed mold to form the colored contact lens. In the case of printing molds, the ink on the printed mold would be transferred to the lens after the lens-forming material is cured in the printed mold.

An ink can be applied to a contact lens or a molding surface of a mold according to pad-transfer printing technology. In pad-transfer printing, a color image is placed or printed on a pad transfer device and the image on the pad transfer device is transferred to another surface, such as a polymer or lens (U.S. Pat. Nos. 3,536,386 to Spivack; 4,582,402 and 4,704,017 to Knapp; 5,034,166 to Rawlings et al., herein incorporated by reference in their entireties). A typical example of this printing follows. An image is etched into metal to form a cliché. Clichés used in the present invention may be made of ceramics or metals (e.g. steel). Images can be etched into a cliché according to any methods known to a person skilled in the art, for example, by chemical etching or laser ablation or the like.

The cliché s may be cleaned after use, such as soaking in an appropriate solvent, sonication, or mechanical abrasion. A cleaning is particularly preferred in case of shallower cliché s (e.g. 20 µm depth), where ink buildup might cause a more rapid degradation of the pattern.

The cliché is placed in a printer. Once in the printer, the cliché is inked by either an open inkwell doctoring system or by a closed ink cup sliding across the image. Then, a silicone pad picks up the inked image from the cliché and transfers the image to the contact lens. The transfer silicone pad comprises an addition-cure RTV silicone, and the transfer pad has been subjected to a post heat treatment so as to impart a reduced silicone oil residue release to the pad by at least 50 percent relative to a control pad transfer pad having identical composition without post heat treating. Properties of the silicone material permit the inks to stick to the pad temporarily and fully release from the pad when it contacts a contact lens or a mold. Inks for pad printing operations will preferably have one or more of the following characteristics: viscosity lower than about 50,000 cps, preferably lower than about 5000 cps and most preferably below 1500 cps, particle size less than about 5 m (for non-pearlescent pigment), surface tension from about 20 mN/m to about 60 mN/m; prolonged stability (i.e., stable for about 4 hours, preferably at least 8 hours, more preferably at least 24 hours, even more preferably at least 7 days, most preferably at least three weeks); an appropriate color level (visible by eye); good adhesion to medical devices; and good transfer from a mold to a medical device made in the mold. The physical stability of an ink could differ from its chemical stability. For example, pigments might settle from the ink (physical phenomenon) yet the ink may not have undergone any significant chemical reaction. For such situations the ink can be restored to a useable state by simply stirring or remixing. Other means of slowing or eliminating settling of pigment include but are not limited to use of additives, altering pH, in-line mixing, refrigeration, altering particle size of pigments, and coating pigment of pigment particles.

The contact lens may then be formed by spin casting as described in U.S. Pat. No. 5,034,166 or preferably by cast molding. For cast molding, a mold generally comprises at least two mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

A contact lens forming mold to be used in the present invention generally comprises at least two mold halves, i.e. first and second mold half. The first mold half defines a first optical surface and the second mold half defines a second optical surface. The first and second mold halves are configured to receive each other such that a lens forming cavity is formed there in between the first molding surface and the second molding surface. The molding surface of a mold half is the cavity-forming surface of the mold and in direct contact with lens-forming material.

Lens forming molds may be made by all materials known in the art for making molds. Example are polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or quartz, glasses or sapphire. The molds may be one-way or reusable molds. Reusable molds following the production of a lens may be cleaned rapidly and effectively from the uncrosslinked prepolymer and other residues, using water or a suitable solvent, and can be dried with air.

The "front or anterior surface" of a contact lens, as used herein, refers to the surface of the lens that faces away from the eye during wear and it is typically substantially convex. The "rear or posterior surface" of a contact lens, as used herein, refers to the surface of the lens that faces towards the eye during wear and it is typically substantially concave.

While, either the front or rear surface of the contact lens or both may be printed, it is preferable to apply the ink to the front surface of the lens. However, there are special cosmetic effects achievable by providing a pattern on both the anterior and posterior surfaces. For instance, a colored pattern of one color can be applied to the back surface of the lens or the corresponding mold-half (for instance, white) and the same or different colored pattern can be applied to the front surface of the lens or the corresponding mold-half (for instance, dark blue). This then would result in a lens that could have either a multi-color textured appearance for extremely lifelike appearance, or a brighter tint using a white background to reflect back out at the observer. If the ink is applied to both sides of a lens by printing up both sides of the mold, a pattern is affixed to both the back surface and the front surface molds as aforedescribed. Part of the lens-forming monomer mixture is supplied to each of the mold halves and each is partially polymerized thus fixing the patterns to the front and back surfaces of the lens. The two mold halves are combined, and the combination is interpolymerized to complete the cure and the formation of the lens with the patterns on both surfaces. In addition the lens forming material may comprise small amount of a pigment to impart a uniform transparent, colored tint to the whole lens.

A contact lens can be clear before it is printed upon. Alternatively, a contact lens can be tinted prior to being printed upon. That is, a colorant may have been added to that lens using methods that are well known in the art before that lens is printed upon using the printing method of the invention. Most preferably the transfer pad shall pass the Silicone Residue Release test and durability test. In addition, the colored image generated according to the present invention on the contact lens shall pass a Cytoxicity test and at least a print quality test.

Example 1

A print pad formulation is prepared consisting of 10 parts HSIII base (Dow Corning), 1 part HSIII catalyst and 1 parts DC200 silicone oil. The formulation is degassed for 10 minutes at 27.5 ft Hg (vacuum) in a vacuum chamber at 25° C. The formulation is then poured into the polyethylene molds (about 14 grams per pad) and adhesion-promoter-primed pad bases (CI primer, silicones, Inc) are used to cap the pad formulation in the mold. The pads are allowed to cure for 24 hours at room temperature. Subsequently, pads are manually removed from the molds and placed in an oven at 75° C. for 48 hours for post treatment. Pads are then removed from the oven for further testing (cytotoxicity, silicone release and print quality).

Example 2

A print pad formulation is prepared consisting of 10 parts silastic P1 base (Dow Corning), 1 part silastic P1 catalyst and 4 parts DC200 silicone oil. The formulation is degassed for 5 minutes at 25 ft Hg (vacuum) in a vacuum chamber at 25° C. The formulation is then poured into the polyethylene molds (about 12.5 grams per pad) and adhesion-promoter-primed pad bases (CI primer, silicones, Inc) are used to cap the pad formulation in the mold. The pads are allowed to cure for 24 hours at room temperature. Subsequently, pads are manually removed from the molds and placed in an oven at 75° C. for 48 hours for post treatment. Pads are then removed from the oven for further testing (cytotoxicity, silicone release and print quality).

Example 3

A print pad formulation is prepared consisting of 10 parts P10 base (Silicones, Inc.), 1 part P10 catalyst. The formulation is degassed for 6 minutes at 25 ft Hg (vacuum) in a vacuum chamber at 25° C. The formulation is then poured into textured aluminum and polyethylene molds (about 11 grams per pad) and adhesion-promoter-primed pad bases (CI primer, silicones, Inc) are used to cap the pad formulation in the mold. The pads are allowed to cure for 24 hours at room temperature. Subsequently, pads are manually removed from the molds with relative ease and placed in an oven at 75° C. for 48 hours for post treatment. Pads are then removed from the oven for further testing (cytotoxicity, silicone release and print quality).

TABLE 1

Silicone release behavior for HSIII, P1 and P10 pads both pre and post heat treatment.

| Formulation | % extractable silicone material by toluene | Pre-heat silicone release (ppm) mean +/− SD | Post heat treatment silicone release (ppm) mean +/− SD |
|---|---|---|---|
| Example 1: HSIII (Tin-catalyzed RTV) | Unknown | 92.7 +/− 16.0 | 76.1 +/− 10.6 |
| Example 2: P1 (Platinum-catalyzed RTV) | 38.75 | 7.5 +/− 9.9 | 41.8 +/− 23.4 |
| Example 3: P10 (Platinum-catalyzed RTV) | 48.75 | 131.7 +/− 17.5 | 6.0 +/− 5.5 |

The % extractable silicone material by toluene is used to measure the relative amount of relatively low molecular weight siloxane containing material such as silicone oil added to the formulation. The standard Tin-catalyzed HSIII pad exhibits high silicone release (92.7 ppm based on silicone release weight per pad weight (not including base weight, N=5), and the silicone release is reduced slightly after post heat treating.

As far as platinum catalyzed RTV formulation, the P1 formulation has lower silicone oil content than the P10 formulation as indicated by their % extractable silicone material by toluene. However, after post heat treatment, the P10 formulation has a much lower silicone release than P1 formulation. The difference is at least partly due to that the material extractable by toluene of P10 formulation to be primarily consistent with a siloxane of about 100 cSt, while the material extractable by toluene of P1 formulation to be primarily consistent with a siloxane of about 50 cSt. The test procedure was described as follows:

The samples P1 and P10 were extracted with toluene and the soluble portion were analyzed by gel permeation chromatography (GPC) in order to quantity the amount and viscosity of the extractables. The material extracted from P10 samples (N=4) was similar for all four samples and consisted of two main peak areas and the majority of the material (95% plus at 13-17 minutes) eluted similar to what would be expected for a polydimethylsiloxane (PDMS) of about 100 cSt. While the material extracted from P1 samples (N=4) was similar for all four samples and consisted of three main peak areas, the majority of the material (95% plus at 13-17 minutes) eluted similar to what would be expected for a polydimethylsiloxane (PDMS) of about 50 cSt.

TABLE 2

Pad adhesion to base table: Adhesion studies of different formulations andbases.

| Run ID | Base material | formulation | Adhesion yield (%) | N (# pads in sample) |
|---|---|---|---|---|
| Example 1 | Nylon | HSII | 88 | 25 |
| Example 2 | Nylon | P1, Silastic | 76 | 50 |
| Example 3 | Nylon | P10, Silicones, Inc. | 100 | 10 |

Pad adhesion to bases is critical in determining pad yield. Here we see a problem with base adhesion when the P1 formulation is used, perhaps due to increased adhesion to the mold surface. The P10 formulation permits improved mold release. In addition, the transfer pad with P10 formulation provides a better printing quality on contact lens.

What is claimed is:

1. A method of making a pad transfer printing pad suitable for transferring ink to contact lenses comprising the steps of:
    (a) providing a pad transfer printing pad, wherein the pad comprising an addition-cure room temperature vulcanized silicone;
    (b) post heat treating the pad transfer printing pad so as to impart a reduced silicone residue release by at least 50 percent to the pad relative to a control transfer pad having identical composition without post heat treating.

2. The method of claim 1, wherein the printing pad further comprising a silicone oil.

3. The method of claim 2, wherein the silicone oil is about 5 percent to 30 percent of the total weight of addition-cure room temperature vulcanized silicon.

4. The method of claim 1, wherein the post-heat treating is at temperature conditions within a range of from 70 to 85 degrees Celsius.

5. The method of claim 1, wherein the post-heat treating is provided for 24 to 72 hours.

6. The method of claim 1, wherein the hardness is from 50 to 90 Shore (00).

7. The method of claim 1, wherein the hardness is from 55 to 65 Shore (00).

8. The method of claim 1, wherein the pad transfer printing pad has a negative cytotoxicity test result.

9. The method of claim 1, wherein the transfer pad is characterized by having a texture ranging from 0.5 to 2.0 μm surface finish as measured using the root mean squared (RMS) method.

10. The method of claim 9, wherein the textured transfer pad is characterized by having a gloss ranging from 1 to 10.

11. A transfer-printing method for making a colored hydrogel contact lens, comprising the steps of:
    (a) inking, with an color ink, at least one cliché having an image to be printed on a contact lens to form an inked image in the cliché;
    (b) transferring the inked image from the cliché to at least one surface of at least one contact lens by means of at least one transfer pad, wherein the transfer pad comprises an addition-cure RTV, and the transfer pad has been subjected to a post heat treatment so as to impart a reduced silicone residue release to the pad by at least 50 percent relative to a control transfer pad having identical composition without post heat treating,
    (c) curing the inked contact lens to cause the color ink to adhere to the contact lens, wherein better print quality after a post heat treatment.

12. The method of claim 10, wherein the hardness is from 50 to 90 Shore (00).

13. The method of claim 10, wherein the hardness is from 55 to 65 Shore (00).

14. The method of claim 10, wherein the transfer pad is characterized by having a texture ranging from 0.5 to 2.0 μm surface finish as measured using the root mean squared (RMS) method.

15. The method of claim 10, wherein the transfer pad further comprises a silicone oil.

16. A transfer-printing method for making a colored hydrogel contact lens, comprising the steps of:
(a) inking, with a color ink, at least one cliché having an image to be printed on a contact lens to form an inked image in the cliché;
(b) transferring the inked image from the cliché to at least one surface of at least one contact lens forming mold by means of at least one transfer pad, wherein the transfer pad comprises an addition-cure RTV silicon, and the transfer pad has been subjected to a post heat treatment so as to impart a reduced silicone residue release to the pad by at least 50 percent relative to a control transfer pad having identical composition without post heat treating,
(c) at least partially curing the inked image transferred on the mold surface to form a colored film;
(d) dispensing a hydrogel lens-forming material into at least one lens-forming cavity of the mold; and
(e) curing the lens-forming material within the lens-forming cavity to form the contact lens, whereby the colored film detaches from the molding surface and becomes integral with the body of the contact lens.

17. The method of claim 15, wherein the hardness is from 50 to 90 Shore (00).

18. The method of claim 15, wherein the hardness is from 55 to 65 Shore (00).

19. The method of claim 15, wherein the transfer pad is characterized by having a texture ranging from 0.5 to 2.0 μm surface finish as measured using the root mean squared (RMS) method.

* * * * *